United States Patent

Butka

Patent Number: 5,334,060
Date of Patent: Aug. 2, 1994

[54] PROPULSION SYSTEM

[76] Inventor: Kemal Butka, 372 Central Park West, New York, N.Y. 10025

[21] Appl. No.: 100,575

[22] Filed: Jul. 30, 1993

[51] Int. Cl.⁵ .................................... B60L 11/02
[52] U.S. Cl. ........................................... 440/6
[58] Field of Search ............... 440/6, 38, 47, 40, 42, 440/113; 60/221, 222; 310/11; 417/50

[56] References Cited

U.S. PATENT DOCUMENTS 4,629,432 12/1986 Dyrkorn et al. ............... 440/52
5,111,087 5/1992 Butka ............................. 310/11

FOREIGN PATENT DOCUMENTS 141695 12/1934 Austria ............................ 440/38
29184 of 1912 United Kingdom ........... 440/38
1238803 7/1971 United Kingdom ........... 440/38

Primary Examiner—Edwin L. Swinehart
Attorney, Agent, or Firm—Michael J. Striker

[57] ABSTRACT

A propulsion system has a means generating an electric current, an element generating a magnetic field substantially perpendicular to the electric current, an element forming a duct arranged so that by interaction of the magnetic field and the electric current a force in a liquid accommodated in the duct is produced and the liquid is moved, and a shaped element formed so that the moved liquid passes through the shaped element and applies a thrust force to the shaped element in a forward direction and then exits the shaped element to create a reaction force in an opposite direction to provide an additional thrust force applied to the shaped element.

9 Claims, 4 Drawing Sheets

PROPULSION SYSTEM

BACKGROUND OF THE INVENTION

The present invention relates generally to propulsion systems and more particularly to magnetohydrodynamic propulsion systems.

Propulsion systems of the above-mentioned type have been developed relatively recently, in particular in the United States, the Soviet Union and Japan. The known magnetohydrodynamic propulsion system involves an interaction of magnetic fields and fluids that conduct electricity. In a known magnetohydrodynamic propulsion system a pair of electrodes on either side of the thruster pass an electric current through, for example, sea water. At a right angle to the current is the magnetic field generated by the superconducting magnet. The interaction of the magnetic field and the current produces a strong force on the water, so that the water is moved through the duct in the center of the magnet. In known magnetohydrodynamic propulsion systems the system is open so that the water continuously or periodically enters the system and exits to produce a respective force.

My U.S. Pat. No. 5,111,087 discloses a new propulsion system in which for the propulsion of a liquid applying a thrust, a closed duct is formed so that the liquid circulates inside the system and does not escape from it. The duct can be connected with a vehicle so as to transfer the thrust to the vehicle. The propulsion system disclosed in this patent is used for the propulsion of vehicles in a longitudinal propulsion direction. It is believed to be clear that it is advisable to further improve and modify the existing propulsion systems of this type.

SUMMARY OF THE INVENTION

Accordingly, it is an object of the present invention to provide a propulsion system which is a further modification of the existing magnetohydrodynamic propulsion systems.

In keeping with these objects and with others which will become apparent hereinafter, one feature of the present invention resides, briefly stated, in a propulsion system which comprises means generating an electric current, means generating a magnetic field substantially perpendicular to the electric current, means forming a duct arranged so that by interaction of the magnetic field and the electric current a force in a liquid accommodated in the duct is produced and the liquid is moved, and a shaped element formed so that the moved liquid passes through the shaped element and applies a thrust to the shaped element in a forward direction and then exits the shaped element in an opposite direction to produce a reaction force providing an additional thrust applied to the shaped element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
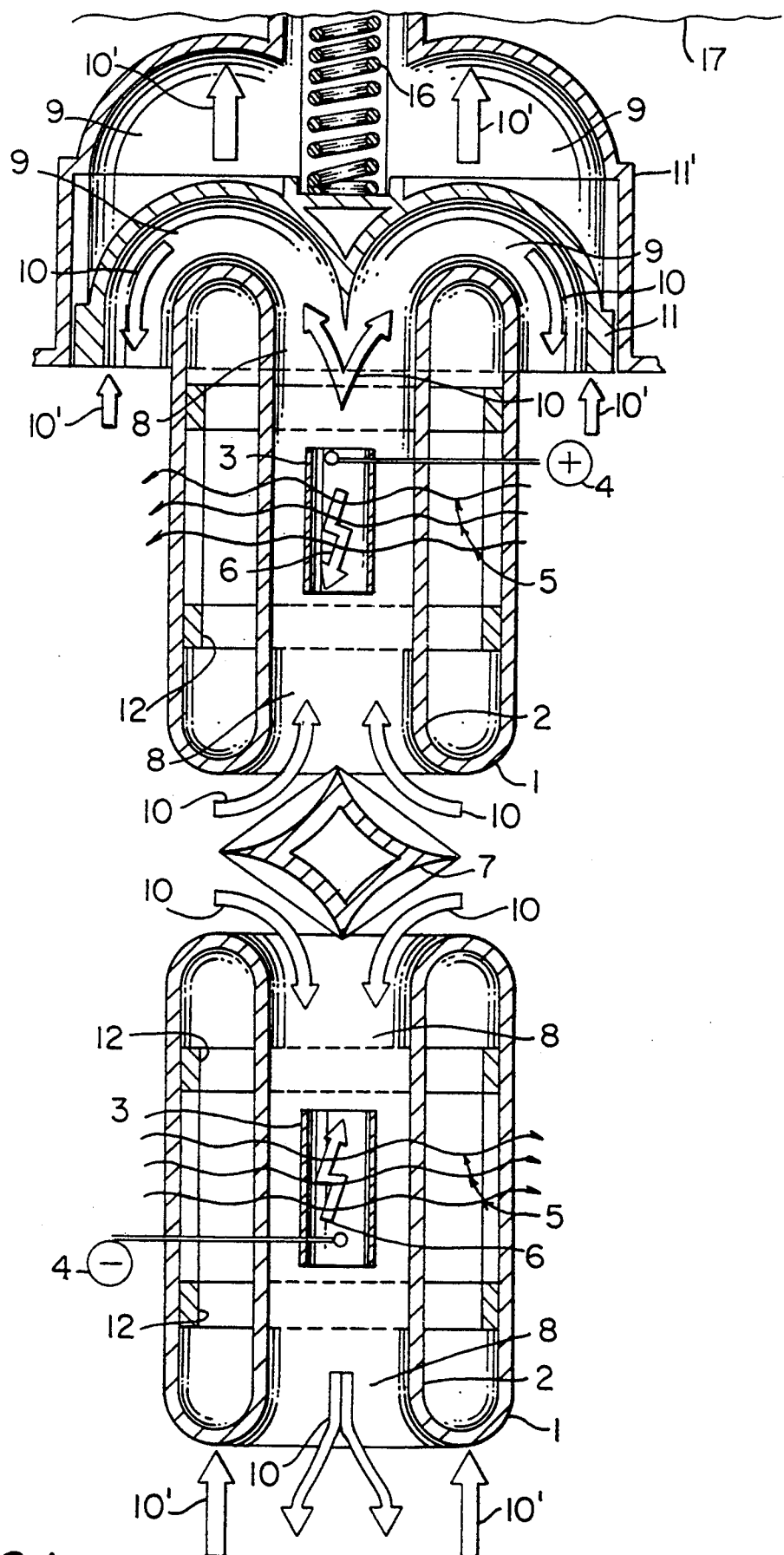
FIG. 1 is a view showing a propulsion system in accordance with the present invention.

A propulsion system in accordance with the present invention as shown in FIG. 1 operates in a body of water 17. It has two magnetic field generating elements 1 located one after the other in a propulsion direction, and each formed as a torus 2. Reinforcing rings 12 are located inside each of the magnetic field generating elements and formed as rings. Electrodes 3 are arranged inside the toruses 2 and connected by conductors 4 to an electric source. The electric current 6 produced by the electrodes 3 is substantially perpendicular to the magnetic field produced by the magnetic field generating elements 1 which are formed for example as superconducting magnets. A divider 7 is provided between two magnetic field generating elements 1 to guide flows of water.

Each torus 2 of the electromagnetic field generating element 1 has an inner duct 8. Arcuate ducts 9 are formed between the forward end of the forward torus 2 and a shaped element 11 having two arcuate portions located side by side. A front element 11' is located in front of and partially surrounds the shaped element 11 with the interposition of a spring 16.

In operation, when the magnetic field generating elements and the electric current producing elements are actuated, the water flows both into the forward torus 2 and the rearward torus 2 being guided by the divider 7. In the forward torus 2 the water flows through the inner passage 8 in the longitudinal direction and applies a thrust in a forward direction to the shaped element 11 which is transmitted through the central part of the shaped element 11 and the spring 16 to the front element 11'. At the same time the water flows along arcuate ducts 9 around the forward portion of the forward torus 2 and exits the ducts in an opposite direction to produce a reaction force. A propulsion force is therefore produced by a combination of the thrust force applied to the shaped element 11 by the forward water flow through the passage 8 and the reaction force of water produced by the rearward water flow exiting the arcuate ducts 9. In the rearward torus 2 the water flows through the central passage 8 in an opposite direction and exits the passage 8 thus creating an additional reaction force. This additional reaction force also contributes to the total propulsion force.

Figure 2:
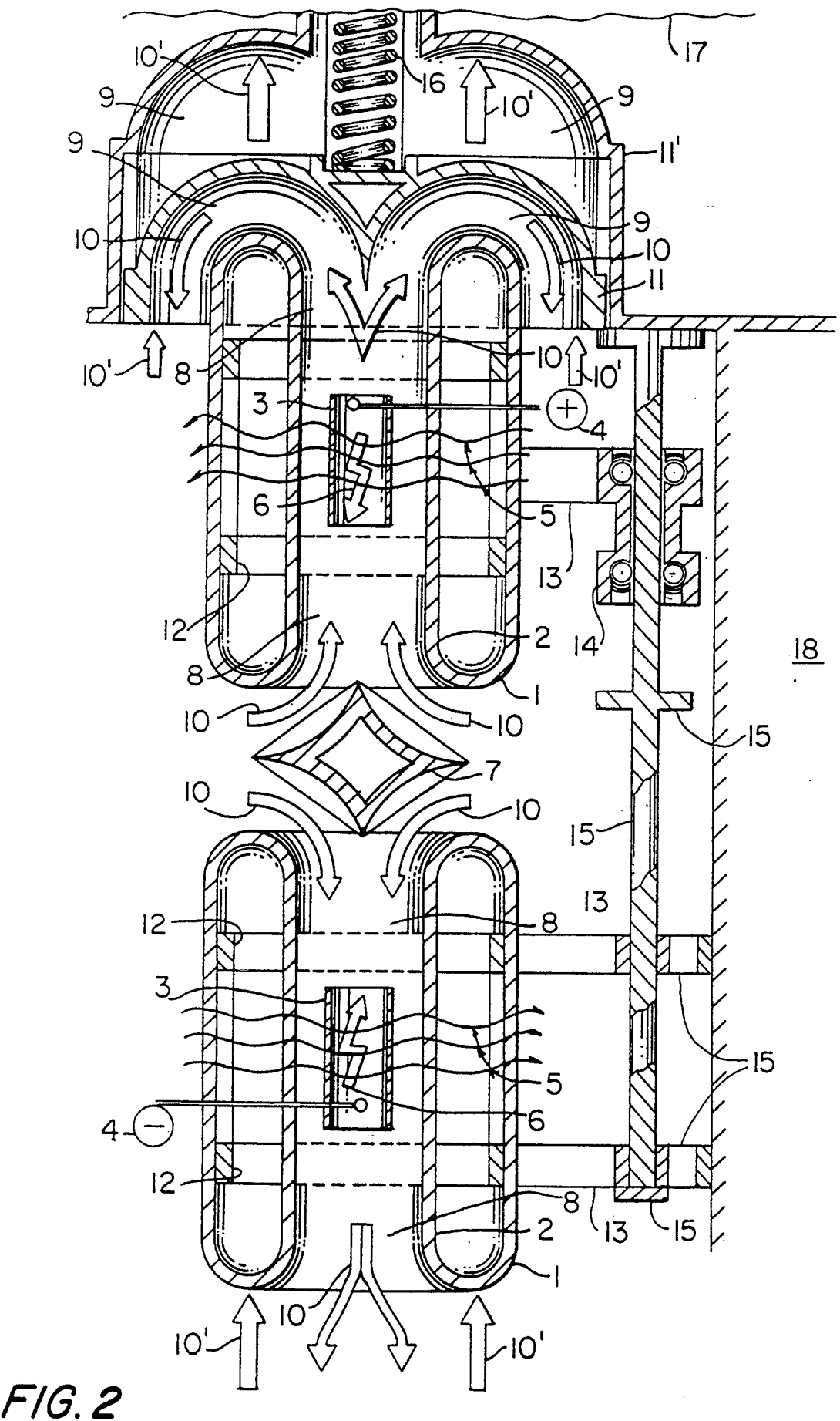
FIG. 2 is a view showing the propulsion system of FIG. 1 with some modifications.

In the embodiment of FIG. 2, the front element 11' is connected to an outside object 18, for example, the hull of a ship. The forward torus 2 is connected by a connector 13 with a ball bearing 14, while the reinforcing rings 12 of the rearward torus also have extended connectors 13. An element 15 is received in the bearing 14 and the rearward connectors 13 displaceably in a longitudinal direction. When a total force is generated in the propulsion system of FIG. 2, it is transmitted by the front element 11' to the hull of the ship 18 to propel the latter, while the toruses 2 are longitudinally displaceable relative to the element 15.

In both embodiments, the direction of the flow of water is identified by directional arrows 10, while the forces applied in the system are identified by the arrows 10'.

Figure 3:
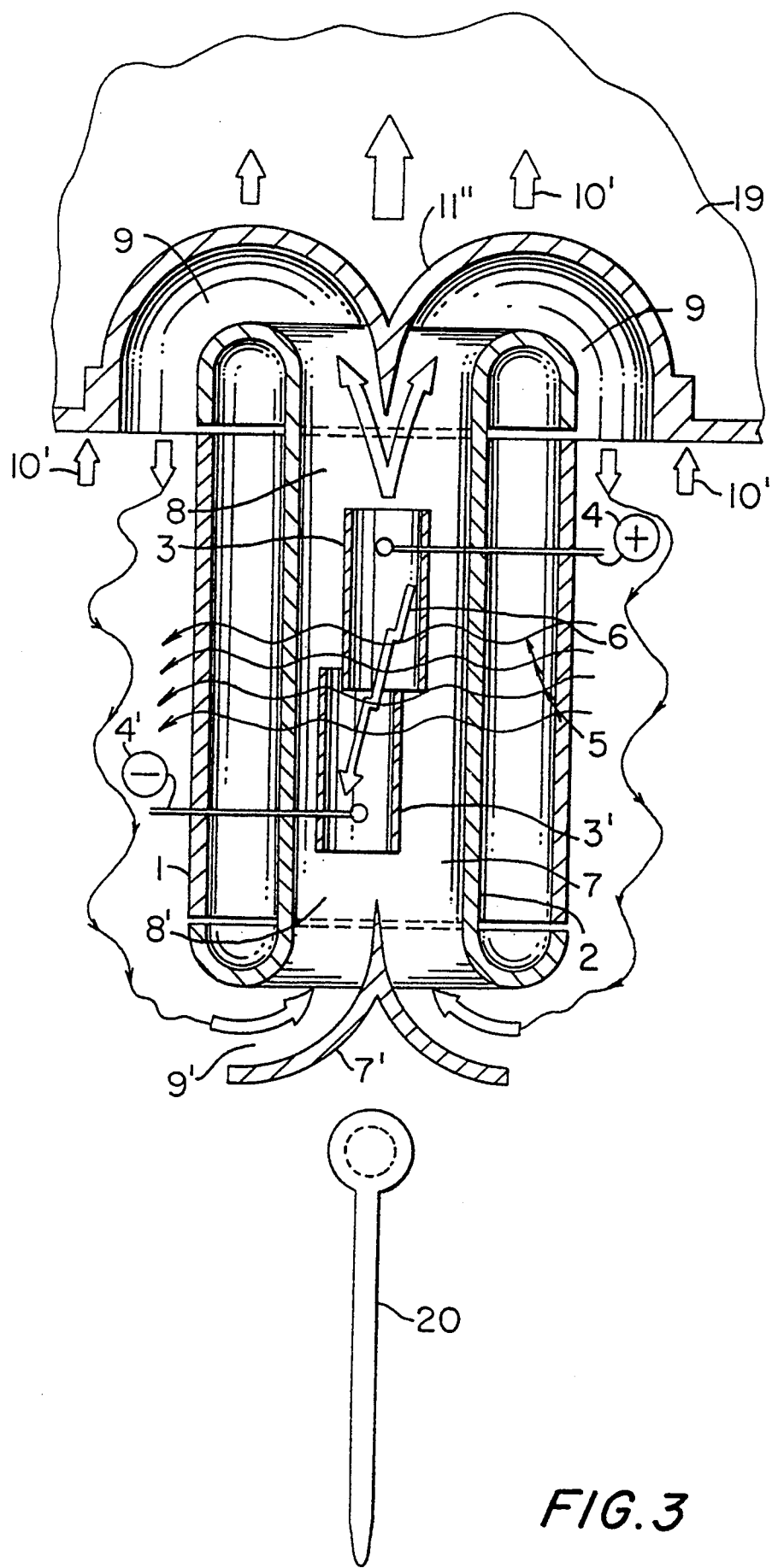
FIG. 3 is a view showing a further embodiment of the inventive propulsion system.
Figure 4:
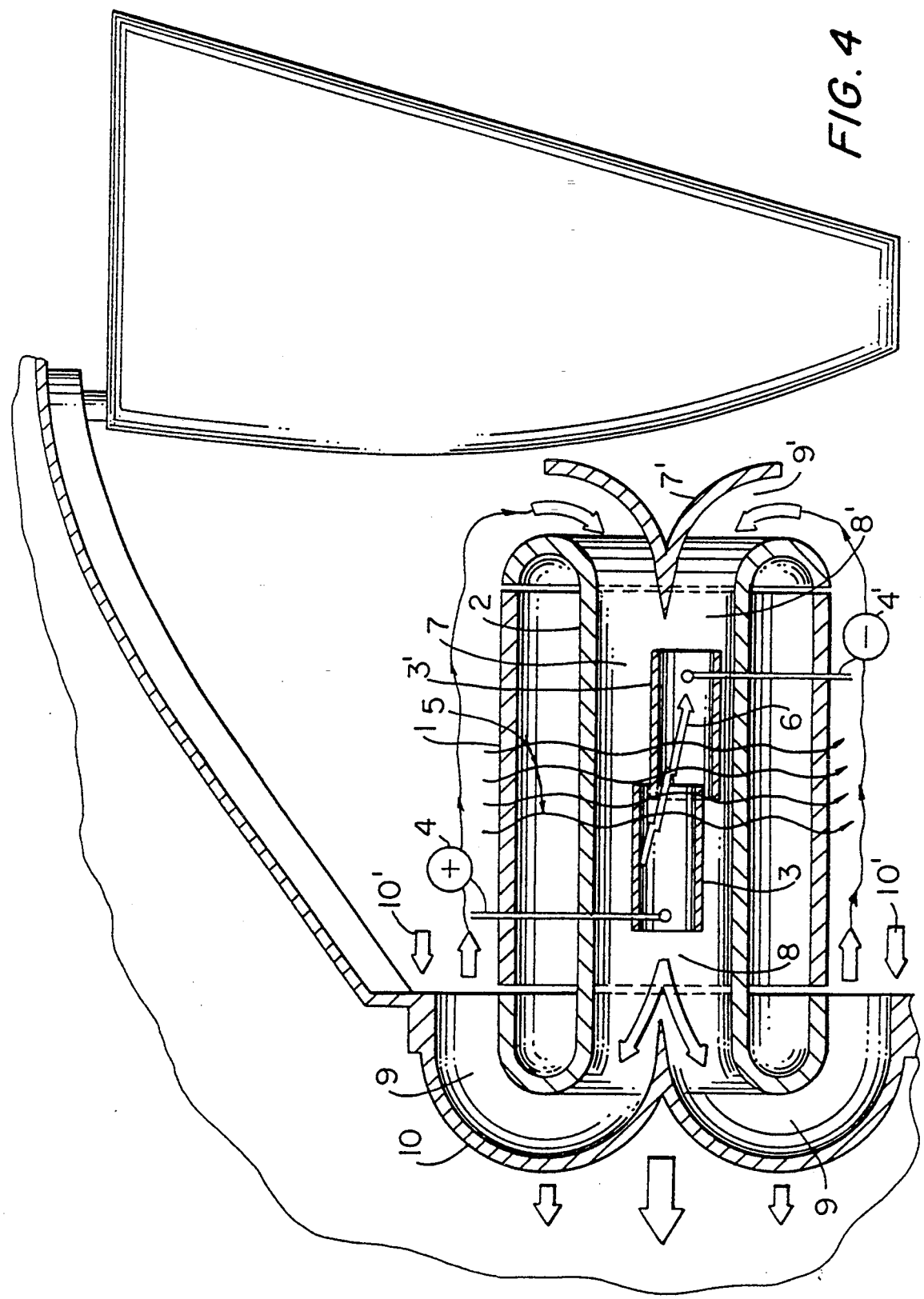
FIG. 4 is a view showing a section taken along the line IV—IV in FIG. 3.

In the embodiment of FIGS. 3–4, there is only one magnetic field generating element formed as the torus 2, and two electrodes 3 and 3' connected by conductors 4 and 4' with an electric source. The divider 7' is formed somewhat differently in order to direct water only into the inner passage 8, and there is only one shaped element 11" connected with an object 19. The water is admitted into the inner channel 8, flows through it, exits through the arcuate ducts 9 and again flows into the inlet of the torus 2. A turnable rudder 20 is located near an inlet of the divider 7' to steer the system in a desired direction.

In this system also a thrust force acts on the shaped element 11' during movement of the water in the passages 8, and an additional reaction force is produced by water flow exiting the arcuate ducts 9.

It will be understood that each of the elements described above, or two or more together, may also find a useful application in other types of constructions differing from the types described above.

While the invention has been illustrated and described as embodied in a propulsion system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A propulsion system, comprising a shaped element attachable to an object to be propulsed and a magnetohydrodynamic propulsion device including means generating an electric current and means generating a magnetic field substantially perpendicular to the electric current and means forming an inner duct, said magnetohydrodynamic propulsion device being located as a whole upstream of said shaped element and forming with the latter at least one arcuate duct, so that by interaction of the magnetic field and the electric current of the magnetohydrohynamic device a force in a liquid is produced which pulls the liquid into said inner duct in a propulsion direction, then pushes the liquid through said inner duct in the propulsion direction into said arcuate duct to apply a thrust force in the propulsion direction, and then the liquid leaves said arcuate duct to create a reaction force in the propulsion direction to provide an additional thrust force applied to said shaped element in the propulsion direction.

2. A propulsion system as defined in claim 1, wherein said means generating a magnetic field is formed as a torus having two ends, said shaped element including two arcuate portions extending over and at a distance from one of said ends of said torus so as to form in said arcuate duct two arcuate duct sections located side by side in a direction which is transverse to the propulsion direction and extending around side ends of said torus.

3. A propulsion system as defined in claim 1; and further comprising an additional shaped element located downstream of said first mentioned shaped element, said first-mentioned shaped element being displaceable relative to said additional shaped element with the interposition of a spring so as to apply said thrust forces to said additional shaped element in a springy manner.

4. A propulsion system as defined in claim 1; and further comprising a second such magnetohydrodynamic propulsion device located upstream of said first mentioned magnetohydrodynamic propulsion device and including a second such means generating a magnetic field, and a second such means generating an electric current, said means generating a magnetic field of said devices being formed as two toruses spaced from one another in a propulsion direction.

5. A propulsion system as defined in claim 4; and further comprising a divider arranged between said toruses of said magnetohydrodynamic propulsion devices and guiding water into each of said toruses, said divider having first two concave sections facing one of said toruses and second two concave sections facing the other of said toruses.

6. A propulsion system as defined in claim 4, wherein said torus of said second magnetohydrodynamic propulsion device has a passage with one end facing said torus of said first mentioned magnetohydrodynamic propulsion device has water flows and another end through which the water exits so as to produce a reaction force which in turn produces an additional thrust force acting on said torus of said second magnetohydrodynamic propulsion device.

7. A propulsion system as defined in claim 3; and further comprising means for connecting said additional shaped element to a vehicle, so that the thrust force applied to said first-mentioned shaped element is transmitted to said additional shaped element and thereafter to the vehicle.

8. A propulsion system as defined in claim 2, wherein said torus has an inlet end; and further comprising an arcuate divider arranged at said inlet end to direct water into said torus and having a central rear concave surface.

9. A propulsion system as defined in claim 8; and further comprising a rudder element arranged to steer the system and located in the region of said central rear concave system of said arcuate divider.

* * * * *